United States Patent [19]

Swain

[11] 4,118,791

[45] Oct. 3, 1978

[54] MULTI-LEVEL ENCODING SYSTEM

[75] Inventor: Richard Slaughter Swain, Des Plaines, Ill.

[73] Assignee: Norlin Music, Inc., Lincolnwood, Ill.

[21] Appl. No.: 790,293

[22] Filed: Apr. 25, 1977

[51] Int. Cl.$^2$ .......................... G06F 13/00; G06F 3/00
[52] U.S. Cl. .............................. 364/900; 340/347 DD; 325/38 A
[58] Field of Search ............. 340/347 DD; 325/38 A; 235/92 CV; 364/900; 360/40; 328/156, 157, 158

[56] References Cited

U.S. PATENT DOCUMENTS

| | | | |
|---|---|---|---|
| 3,587,088 | 6/1971 | Franaszek | 325/38 A |
| 3,678,194 | 7/1972 | Orrell, Jr. | 325/38 A |
| 3,753,113 | 8/1973 | Maruta | 340/347 DD |
| 3,754,237 | 8/1973 | de Meux | 340/347 DD |
| 3,927,401 | 12/1975 | McIntosh | 325/38 A |
| 3,952,298 | 4/1976 | Winkelmann | 340/347 DD |
| 3,988,676 | 10/1976 | Whang | 325/38 A |
| 4,003,041 | 1/1977 | van Duren | 325/38 A |
| 4,020,282 | 4/1977 | Halpern | 325/38 A |
| 4,056,828 | 11/1977 | Furuta | 325/38 A |

*Primary Examiner*—James D. Thomas
*Attorney, Agent, or Firm*—Ronald J. Kransdorf; Jack Kail

[57] ABSTRACT

An encoder providing on a single terminal of a circuit package a composite serial data stream containing both stored data bits of a multistage binary memory and a clock signal needed for decoding the data. A parallel to serial converter serially shifts the stored binary data bits to an output thereof in response to clock pulses of an internal clock, and a logic circuit responsive to both the internal clock and the serial binary data from the converter generates first, second and third signals of amplitudes discernibly different from one another respectively in response to 1-state data bits, 0-state data bits and the termination of clock pulses. Two fixed inputs to the converter respectively provide a 1-state start bit at the beginning of the set of data bits and a 0-state stop bit at the end of the set of data bits for purposes of decoding. An amplitude discriminating decoder uses the periodic third signals and the start and stop bits to decode the serial data.

16 Claims, 2 Drawing Figures

MULTI-LEVEL ENCODING SYSTEM

BACKGROUND OF THE INVENTION

This invention generally relates to an encoder and, more particularly, to a serial encoder for encoding both data and necessary information for decoding the data.

In various applications sophisticated and complicated circuits are embodied in a single integrated circuit chip which are packaged in a form such that only a limited number of terminals or pins are available for interfacing with external circuitry, such as D.C. power and reference potential sources, sources of input signals to the integrated circuit and external circuits requiring output signals from the integrated circuit. The cost of manufacturing these integrated circuit packages increases significantly with increases in the number of terminals. Accordingly, it is desirable to minimize the number of terminals whenever possible. For similar reasons, it is desirable to minimize the number of terminals required by circuits mounted on printed circuit boards.

A common circuit element found in numerous circuits is a multistage binary memory, such as a binary counter. In many integrated circuits having such a binary memory, it is desired to transfer the data stored in the memory to circuitry external of the integrated circuit package. One known method of achieving this is to simply connect the output of each stage of the memory to a corresponding one of the integrated circuit pins. Needless to say, this method is not suitable for those applications in which the total number of pins available for access to the memory is less than the total number of stages.

Another known way of providing access to such a memory is to provide the memory data in serial form on a single pin. However, when the data is serialized, further information must be provided to distinguish between the different bits of the data stream and to correlate each output data bit with the associated stage of the memory. A known way of providing this decoding information is to employ another pin for providing the clock signal used to clock out the serial data to distinguish between the different bits and to employ another pin for providing the pulse which initiates the serial transfer of the data, so that the first data bit and thus subsequent data bits can be identified. While this approach has an advantage over the parallel method noted above whenever there are more than three memory stages, it still requires the use of three terminals.

SUMMARY OF THE INVENTION

The principal object of the present invention is to provide an encoder which will enable transferring the stored data of a multistage memory together with all the information necessary to decode that data via a composite signal provided on a signal terminal.

In keeping with this objective, a serial encoder is provided having means for generating a succession of clock pulses respectively associated with a plurality of memory stages of a binary memory and means responsive to the clock pulses and to the logic states of the memory stages associated therewith for providing a composite signal to a single output terminal which is in the form of a serial data stream representative of the stored data and containing the necessary information to decode that data. The composite signal providing means serially generates first, second and third signals respectively in response to clock pulses associated with memory stages in a first logic state, clock pulses associated with memory stages in a second logic state and the periods between clock pulses. The first, second and third data signals are discernibly different from one another. In the preferred embodiment, the signals differ from one another in their amplitude, but other distinguishing modes, such as pulse width and frequency, are contemplated. The third signal, which appears between the first or second signals of adjacent stages, enables a suitable decoder to distinguish between adjacent stages in the same logic state.

In keeping with another aspect of the present invention, a first signal is provided at the beginning of the data to identify to a decoder the data bit from the first stage of the memory and a second signal is automatically provided after the last data bit from the last stage of the memory to indicate the end of information transfer. The decoder can use this information to terminate response to further information, to output the decoded information to other circuitry or to prepare for receipt of the next set of information data.

The foregoing and other features of the invention are illustrated in a preferred embodiment in which the data stored in a binary counter is encoded into a serial data stream each bit of which is in one of three different amplitude signals. The first or greatest amplitude signal indicates that the memory stage associated therewith is in a 1-state. The second or intermediate amplitude signal indicates that its associated memory stage is in a 0-state, and the third or lowest amplitude signal is generated during the periods between clock pulses so that adjacent information data bits of the same amplitude can be distinguished from one another. A parallel to serial converter responsive to the clock pulses converts the data stored in the memory in parallel form to a serial form, and a logic switching circuit, responsive to both the clock pulses and to the serial data from the converter, generates the triamplitude composite output signal. The start and stop bit signals are introduced at the input of the converter by providing fixed signal inputs thereto.

BRIEF DESCRIPTION OF THE DRAWING

The foregoing features and advantages will become apparent and further features and advantages will be disclosed in the description of the preferred embodiment which is given with reference to the several views of the drawing, in which.

DESCRIPTION OF THE PREFERRED EMBODIMENT

Figure 1:
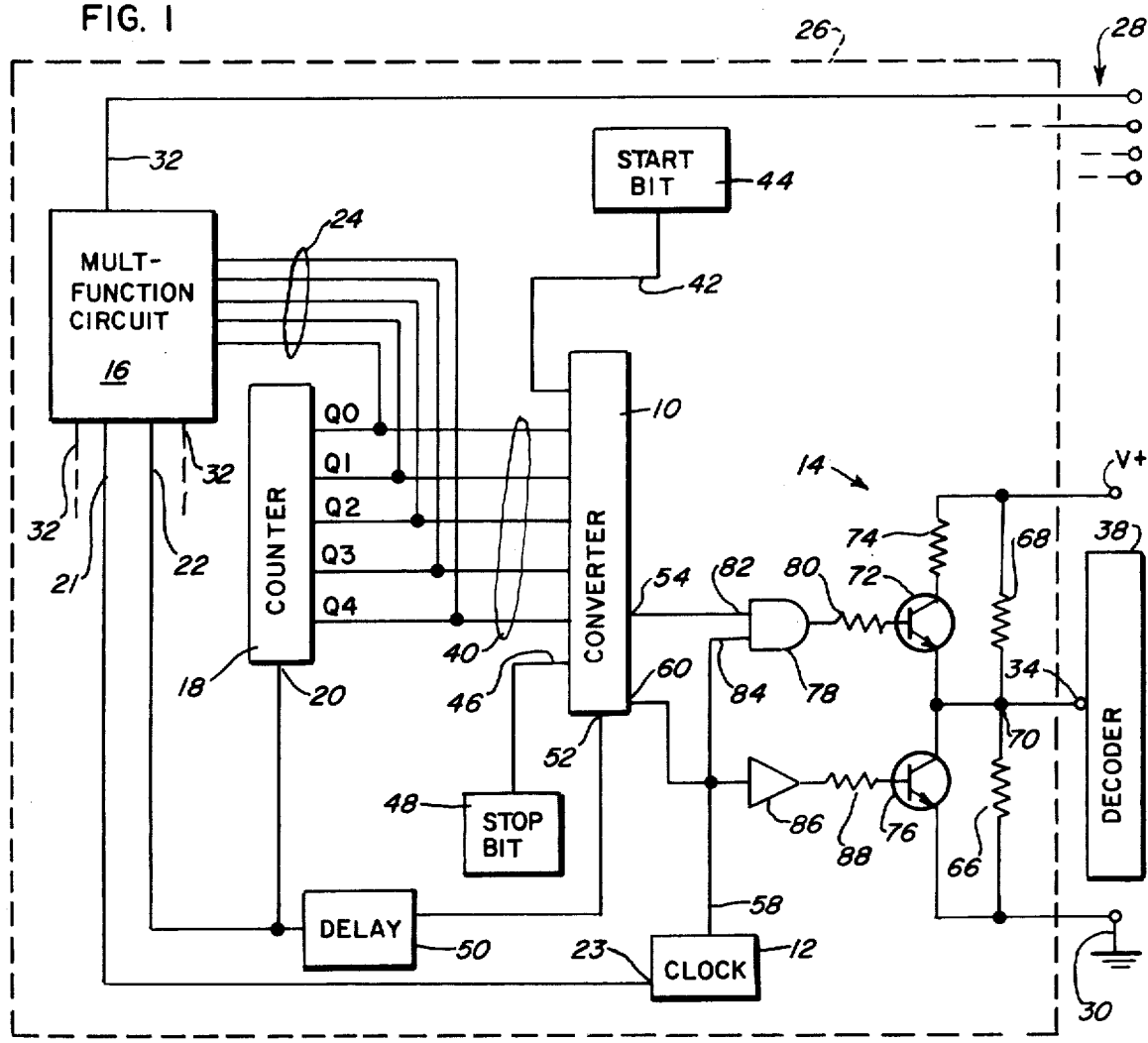
FIG. 1 is a schematic, partially in block form, of one embodiment of the encoder of the present invention.

Referring to FIG. 1, the encoder of the present invention, which includes a parallel to serial converter or converter 10, a shift clock or clock 12 and a logic circuit 14, is shown in conjunction with a multi-function circuit 16 and a binary memory, such as binary counter 18. The multi-function circuit 16 is any arbitrary circuit, such as a digital, rhythm generating curcuit of an electronic organ or the like, that provides pulses to a counter, toggle input 20 via an output line 22 to increment counter 18. These toggle pulses are generated in synchronism with clock 12 under control of a suitable synchronization signal applied to an input 21 from an output 23 of clock 12. In addition, the multi-function circuit 16 may receive signals from outputs Q0, Q1, Q2, Q3 and Q4 of counter 18 via line 24.

The multi-function circuit 16 together with the counter 18 and the encoder are all embodied on a single integrated circuit chip the boundaries of which are indicated by broken line 26. The integrated circuit chip has a limited plural number of terminals or pins 28 available for interfacing the circuitry contained on the circuit chip with circuitry external of the chip. For example, one of pins 28 is required for connection with a source of positive D.C. voltage V+; another is needed for connection with a reference potential, such as ground reference 30, and the remaining pins are required for connection with input/output terminals 32 of multi-function circuit 16. Only one of the output terminals 28, a terminal designated by reference numeral 34, is available for providing an indication of the state of counter 18.

The multi-function circuit 16 forms no part of the present invention and, as indicated, is an arbitrary circuit. It is shown solely for the purposes of illustrating an environment for the encoder in which the benefits from the advantageous features of the encoder are maximized. It should be appreciated that the encoder is not limited to use in an integrated circuit, and the advantages of the encoder can be enjoyed in other environments, such as the environment of a printed or etched circuit board having only a limited number of terminals.

Figure 2:
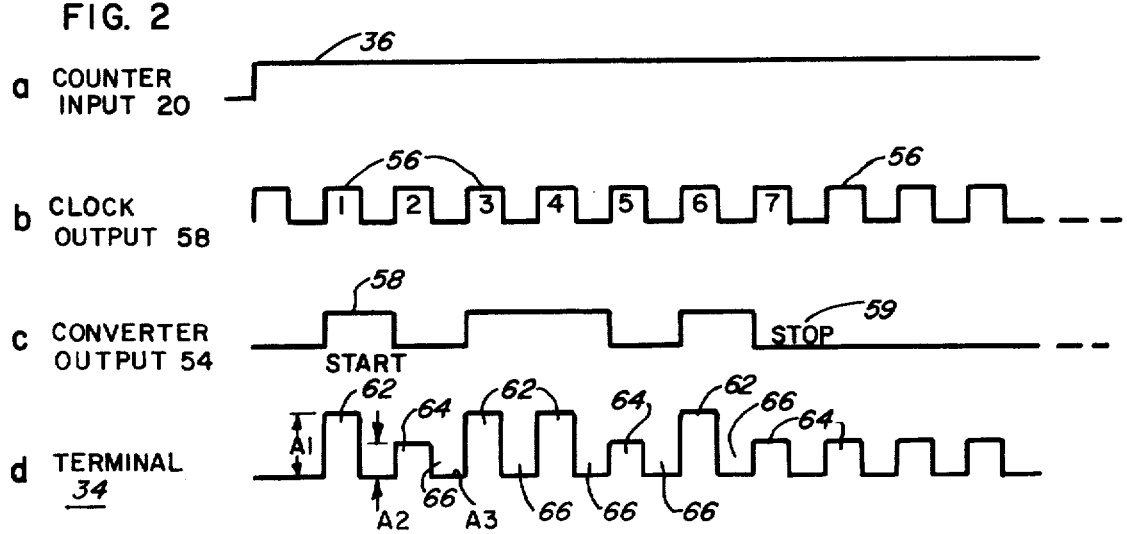
FIGS. 2a-2d are illustrative waveforms of signals generated at different points of the encoder shown in FIG. 1.

The multi-function circuit 16 will not be described further except to state that it periodically generates a pulse 36, as illustrated in FIG. 2a, on its output line 22 which is applied to toggle input 20 of counter 18. The frequencies of the toggle pulses relative to the clock pulses of clock 12 are not critical, so long as the clock pulse frequency is at least equal to N times the toggle pulse frequency, where N equals the total number of bits of the composite output signal. A circuit constructed according to the schematic of FIG. 1, operated successfully with the clock 12 operating at a frequency of approximately 16 kHz and the toggle pulse being generated at a frequency on the order of 50 Hz.

Counter 18 is a conventional 5-stage binary counter which is incremented by a count of one in response to the positive transition of each toggle pulse 36. Outputs Q0–Q4 are respectively associated with the first through fifth stages of counter 18 and provides thereon either 1-state or 0-state signals depending upon the count of the counter. For example, with the counter 18 having a decimal count of 22 (binarily represented by the binary number 10110) output Q0 and Q3 have a 0-state signal thereon and counter outputs Q1, Q2 and Q4 have 1-state signals thereon.

During each pulse 36, the encoder serializes the data on outputs Q0–Q4, introduces start and stop bits at the beginning and end of the set of data bits, alters the serial information by introducing pulses corresponding to pulses generated by clock 12 and provides the serial composite signal to output 34 where it may be decoded by a suitable decoder 38. Converter 10 has seven data inputs including five intermediate data inputs 40 respectively connected with counter outputs Q0–Q4. A first data input 42 is connected with a start bit signal source 44, and seventh data input 46 is connected with a stop bit signal source 48. The start bit signal source 44 always provides a 1-state signal to input 42, and the stop bit signal source 48 always provides a 0-state signal to input 46. The state of intermediate inputs 40, of course, change in accordance with changes in the state of counter 18.

The pulse 36 which causes counter 18 to be incremented is delayed by a digital delay circuit 50 and applied to a load input 52 of converter 10. The converter 10 is conventional and the details thereof form no part of this invention. While a variety of different converter circuits may be used for converter block 10, a type similar to, but having more stages than, the integrated circuit MM54C195/MM74C195 manufactured by National Semiconductor Corp. as shown in their publication "CMOS Integrated Circuits", March 1975 edition, page 76 et seq, was successfully employed. Converter 10 in response to the delayed pulse applied to load input 52 receives for storage the data signals being applied to its inputs 40 and inputs 42 and 46. The delay is provided to ensure that all of outputs Q0–Q4 have changed to the proper state in response to the pulse 36 before that information is loaded into converter 10.

After the data is entered into converter 10, it operates to generate a binary, serial data stream on its data output 54 in response to clock pulses 56, as illustrated in FIG. 2b, generated by clock 12 on its output 58 and applied to clock input 60 of converter 10. The date stored in converter 10 is generated on data output 54, one bit at a time, beginning with the start bit and ending with the stop bit respectively in response to successive clock pulses 56. An example of the data stream which is produced when counter 18 has a count of 22 is shown in FIG. 2c. As seen, beginning with the first clock pulse 56 commencing after or with the positive transition of counter input pulse 36, converter 10 generates a 1-state start signal 58. The duration of start signal 58 as well as the signals for all of the remaining bits is equal to the period of clock 12. With a count of 22 in counter 18, output Q0 is in a 0-state, and thus the positive transition of the second clock pulse 56 results in output 54 switching to a 0-state. Continuing with the example, 1-state signals are generated on converter output 54 during the period between the positive transition of the third and fourth pulses and the fourth and fifth pulses. During the period between the fifth and sixth clock pulses 56, a 0-state signal is generated, and during the period between the sixth and seventh pulses, a 1-state signal is again generated on output 54. Beginning with the seventh and continuing through successive clock pulses 56, until the beginning of the next counter input pulse 36, a 0-state stop signal 59 is provided on output 54.

The logic circuit 14 generates a tri-amplitude signal on pin 34 corresponding to the binary serial data stream generated on output 54 in response thereto and to clock pulses 56. The tri-amplitude or composite signal provided on pin 34 by logic circuit 14 in response to the binary data signal shown in FIG. 2c is illustrated in FIG. 2d. As can be seen by comparing the waveforms of FIGS. 2b, 2c and 2d, a first signal having a first amplitude A1 is generated in response to simultaneous occurrence of a clock pulse 56 and a 1-state data signal on output 54. A second signal 64, having an amplitude A2 less than amplitude A1, is generated in response to simultaneous occurrence of a clock pulse 56 and a 0-state signal on converter output 54. Finally, a third signal 66, having an amplitude A3, which may be zero or ground reference potential, is generated in response to termination or the negative transition of each clock pulse. Alternately, the third signals may be viewed as being generated in response to each 0-state period between clock pulses.

Referring again to FIG. 1, the source of the first signal comprises the D.C. power supply V+ and the source of the third signal comprises reference potential or ground 30. The source of the second signal comprises a fixed voltage divider circuit composed of resistors 66 and 68 connected in series between power source V+ and ground 30 and having a junction therebetween connected with terminal 34. A semiconductor switch such as transistor 72, is connected through a resistor 74 across resistor 68 for operatively connecting the first signal source or D.C. power supply V+ to terminal 34. Another transistor 76 is connected across resistor 66 to operatively connect the third signal source or ground 30 to terminal 34. When neither transistor 72 nor transistor 76 is in a conductive state, the voltage appearing at junction 70 and thus terminal 34 is determined solely by the voltage divider or resistors 66 and 68 which then operatively connects the second signal source to terminal 34. Preferably, resistors 66 and 68 have the same resistance value, such that amplitude A2 is equal to half the amplitude of D.C. power supply voltage V+ and thus half the amplitude of A1.

The means for generating the first signal includes, in addition to transistor 72, an AND gate 78. The AND gate 78 has its output connected to the base of transistor 72 through a resistor 80 to control the conduction thereof and two inputs 82 and 84. Input 82 is connected with data output 54 of converter 10, and input 84 is connected with output 58 of clock 12. When both the clock signal and the data signal from converter 10 are in a 1-state, as occurs during the first, third, fourth and sixth clock pulses as seen in FIGS. 2b and c, AND gate 78 provides a 1-state pulse to the base of transistor 72 which causes it to assume a conductive state. The value of resistor 74 is substantially less than that of resistors 68 and 66, and thus when transistor 72 turns on, the supply voltage V+ is operatively connected to junction 70 and terminal 34. This produces the first signals as shown in FIG. 2d.

The third signals 66, having amplitude A3 equal to ground reference potential 30, are produced whenever transistor 72 assumes a conductive state or turns on. When transistor 72 turns on, it shorts resistor 66 out of the circuit and operatively connects ground reference potential 30 to junction 70 and pin 34. Transistor 76 is controlled solely by the clock signal generated by clock 12. Clock output 58 is connected to the input of an inverter 86, the output of which is connected to the base of transistor 76 through a base resistor 88. During the period between clock pulses, i.e. the 0-state portion of the clock signal shown in FIG. 2b, inverter 86 provides a 1-state signal to the base of transistor 76 causing it to turn on and connect ground reference potential 30 to terminal 34.

The decoder 38 can comprise any number of suitable circuits having level detection capabilities for distinguishing between the three different amplitudes of the composite output signal. Such decoders are well known in the art and the details thereof form no part of the present invention. Accordingly, a detailed description of specific circuitry for the decoder 38 is not provided herein. Briefly, decoding can be readily achieved by driving the clock input and data input of a serial to parallel converter similar to the integrated circuit package MM54C195/MM74C195 noted above with data and clock signals respectively corresponding to data and clock components of the composite output signal on pin 34. Any one of a number of known level detection circuits biased to be responsive to signal amplitudes only in excess of amplitude A2 are usable to generate the data input signal to the serial to parallel inverter. The decoder clock can be generated by a simple semiconductor switch responsive to all positive transitions of the composite output signal. Either the start bit or the stop bit can be used to unload the data in the serial to parallel converter to a suitable memory when transfer of the entire set of data bits is complete.

I claim:

1. In a circuit having a binary memory with a plurality of stages each of which may be in a first or a second logic state and an output terminal available for providing thereon an indication of the binary data stored in said memory, a frequency independent encoder, comprising:

means for generating a succession of clock pulses;
   means coupled to said memory and responsive to said clock pulses for developing a stream of binary data comprising a series of first and second state signals respectively corresponding to the first and second logic states of said memory stages, each of said series of first and second state signals being associated with a respective one of said clock pulses; and
   means responsive to said clock pulses and to said stream of binary data for providing a digital, composite output signal to the output terminal representative of the stored data and the clock pulses, said composite providing means generating first, second and third data signals respectively in response to clock pulses associated with said first state signals, clock pulses associated with said second state signals, and the periods between clock pulses, said first, second and third data signals being discernibly different from one another and being provided regardless of the frequency of said clock pulses.

2. The serial encoder of claim 1 in which said circuit and the serial encoder are embodied in integrated circuit form having a limited number of terminal pins, said output terminal comprising one of said pins.

3. The serial encoder of claim 1 in which the first, second and third data signals have amplitudes discernibly different from one another.

4. The serial encoder of claim 1 in which said means for developing comprises a parallel to serial converter responsive to said clock pulses for converting the data stored in the memory in parallel form to a serial form.

5. The serial encoder of claim 4 wherein said composite output signal providing means includes a source of said first signals,
   a source of said second signals,
   a source of said thrid signals, and
   a switching circuit responsive to the serial form data from the converter and the clock pulses for operatively connecting the sources of said first, second and third signals in accordance therewith,
   said switching circuit including
      means responsive to concurrence of both a clock pulse and a first state data signal for operatively connecting the first signal source to the output terminal,
      means responsive to concurrence of both a clock pulse and a second state data signal for operatively connecting the second signal source with the output, and means responsive to termination of each clock pulse for operatively connecting the third signal source with the output, and 6. The serial encoder of claim 5 in which said first signal source connecting means including a switch connected with the first signal source and the output terminal, said switch having a first state in which the first signal source is applied through the switch and a second state in which the first signal source is not applied through the switch to the output terminal, and a logic circuit for causing the switch to assume its first state in response to simultaneous occurrence of both a clock pulse and a first state data signal from the converter.

7. The serial encoder of claim 6 in which said second signal source connecting means includes means for coupling said source of second signal with the output terminal, said second signal being provided on said output terminal by the second signal source only when said switch is in its second state.

8. The serial encoder of claim 7 in which said means for operatively connecting the third signal source with the output terminal includes a semiconductor switch connected between the output terminal and the third signal source, and means responsive to the period between clock pulses for causing the semiconductor switch to couple the third signal to said output terminal.

9. The encoder of claim 7 in which said second signal source connecting means includes a voltage divider circuit coupled between the first and third signal sources, and means connecting an output of the voltage divider circuit with the output terminal.

10. The encoder of claim 9 in which the voltage divider circuit has one leg connected between the output terminal and the first signal source, and another leg connected between the output terminal and the third signal source, the switch of the first signal connecting means is connected in parallel circuit with said one leg, and the switch of the third signal connecting means is connected in parallel circuit with the other leg.

11. The encoder of claim 1 in which said composite signal providing means includes means for providing a start signal at the beginning of the composite signal representative of the stored data.

12. The encoder of claim 11 in which said start signal comprises one of said first and second signals.

13. The encoder of claim 11 in which said composite signal providing means includes means for providing a stop signal at the end of the composite signal representative of the stored data.

14. The encoder of claim 13 in which said start signal comprises one of said first and second signals and said stop signal comprises the other of said first and second signals.

15. The encoder of claim 14 in which said composite signal providing means includes means for providing a stop signal at the end of the composite signal representative of the stored data.

16. The encoder of claim 1 in combination with means for decoding the digital, composite signal.

* * * * *